United States Patent
Alkalay et al.

(10) Patent No.: US 12,379,853 B2
(45) Date of Patent: Aug. 5, 2025

(54) MANAGING STORAGE EXTENTS USING WEAR LEVELS

(71) Applicant: Dell Products L.P., Round Rock, TX (US)

(72) Inventors: Amitai Alkalay, Kadima (IL); Vamsi K. Vankamamidi, Hopkinton, MA (US); Lior Kamran, Richon LeZion (IL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/526,520

(22) Filed: Dec. 1, 2023

(65) Prior Publication Data

US 2025/0181250 A1 Jun. 5, 2025

(51) Int. Cl.
*G06F 3/06* (2006.01)

(52) U.S. Cl.
CPC .......... *G06F 3/0616* (2013.01); *G06F 3/0634* (2013.01); *G06F 3/0688* (2013.01)

(58) Field of Classification Search
CPC ..... G06F 3/0616; G06F 3/0634; G06F 3/0688
See application file for complete search history.

(56) References Cited

U.S. PATENT DOCUMENTS

| | | | |
|---|---|---|---|
| 8,060,718 B2 * | 11/2011 | Freitas | G06F 12/0246 |
| | | | 711/E12.071 |
| 10,140,034 B2 * | 11/2018 | Fang | G06F 3/0616 |
| 10,642,505 B1 * | 5/2020 | Kuzmin | G06F 3/0679 |
| 11,163,465 B1 | 11/2021 | Dalmatov et al. | |
| 11,314,419 B2 | 4/2022 | Huang et al. | |
| 11,416,396 B2 | 8/2022 | Shatsky et al. | |
| 11,592,988 B2 | 2/2023 | Vankamamidi et al. | |
| 11,755,224 B2 | 9/2023 | Dalmatov | |
| 2020/0042224 A1 * | 2/2020 | Dalmatov | G06F 3/0644 |

OTHER PUBLICATIONS

Alkalay, Amitai, et al.; "Managing Wear Levels of Storage Devices," U.S. Appl. No. 18/526,533, filed Dec. 1, 2023.

* cited by examiner

*Primary Examiner* — Eric Cardwell
(74) *Attorney, Agent, or Firm* — BainwoodHuang

(57) ABSTRACT

A technique is directed to managing wear leveling between storage devices. The technique includes obtaining a wear level metric of a candidate storage extent that includes storage from multiple storage devices. The technique further includes performing an assessment operation that provides an indication that the candidate storage extent satisfies an access criterion. The access criterion is based on the wear level metric. The technique further includes, in response to the assessment operation providing the indication that the candidate storage extent satisfies the access criterion, performing a set of access operations that accesses the candidate storage extent.

20 Claims, 5 Drawing Sheets

MANAGING STORAGE EXTENTS USING WEAR LEVELS

BACKGROUND

Conventional data storage systems manage data on behalf of host computers. Along these lines, such data storage systems write data into and read data from groups of storage devices.

For example, a conventional data storage system may write data into and read data from log-structured storage formed from a group of solid-state drives (SSDs). If new SSDs are added to the log-structured storage, the data storage system proceeds to access the new SSDs together with the existing SSDs without regard to wear differences between the individual SSDs.

SUMMARY

Unfortunately, there are deficiencies to the above-described conventional data storage system that accesses SSDs in log-structured storage without regard to wear differences between the SSDs. For example, suppose that the above-described conventional data storage system initially includes old storage drives that are partially worn, and a user then adds new storage drives. Assuming uniform drive usage between the old storage drives and the new storage drives, the old storage drives would reach 100% wear when the new storage drives are still only partially worn. In this manner, the user incurs drive replacement costs even though not all storage drives have been fully utilized.

In contrast to the above-described conventional data storage system, improved techniques are directed to managing storage extents using wear level metrics. The storage extents are formed from multiple storage devices and have respective wear levels based on the respective storage devices used to form them. Less-worn storage extents are prioritized over more-worn storage extents when performing access operations such as write operations, garbage collection, and so forth. In this manner, usage is weighted towards storage devices with lower wear, providing more-even wearing between storage devices and increasing the functional lifetime of the storage devices with higher wear. Such operation may ultimately defer device replacement longer than an approach that simply accesses the storage extents uniformly.

One embodiment is directed to a method of managing storage devices. The method includes obtaining a wear level metric of a candidate storage extent that includes storage from multiple storage devices. The wear level metric indicates an amount of wear of the candidate storage extent. The method further includes performing an assessment operation that provides an indication that the candidate storage extent satisfies an access criterion. The access criterion is based on the wear level metric. The method further includes, in response to the assessment operation providing the indication that the candidate storage extent satisfies the access criterion, performing a set of access operations that accesses the candidate storage extent.

Another embodiment is directed to an electronic environment that includes memory and control circuitry coupled with the memory. The memory stores instructions that, when carried out by the control circuitry, cause the control circuitry to perform a method of managing storage devices, the method including:

(A) obtaining a wear level metric of a candidate storage extent that includes storage from multiple storage devices, the wear level metric indicating an amount of wear of the candidate storage extent;

(B) performing an assessment operation that provides an indication that the candidate storage extent satisfies an access criterion, the access criterion being based on the wear level metric; and (C) in response to the comparison operation indicating that the wear imbalance level is above the predefined imbalance threshold, providing the first set of storage devices as a first storage tier and the second set of storage devices as a second storage tier.

Yet another embodiment is directed to a computer program product having a non-transitory computer readable medium that stores a set of instructions to manage storage devices, the set of instructions, when carried out by computerized circuitry, causes the computerized circuitry to perform a method of:

(A) obtaining a wear level metric of a candidate storage extent that includes storage from multiple storage devices, the wear level metric indicating an amount of wear of the candidate storage extent;

(B) performing an assessment operation that provides an indication that the candidate storage extent satisfies an access criterion, the access criterion being based on the wear level metric; and (C) in response to the comparison operation indicating that the wear imbalance level is above the predefined imbalance threshold, providing the first set of storage devices as a first storage tier and the second set of storage devices as a second storage tier.

In some arrangements, performing the assessment operation includes performing a comparison operation that indicates that the wear level metric of the candidate storage extent is below a predefined wear level threshold. The comparison operation is a part of a service that identifies less-worn storage extents to access over more-worn storage extents. Additionally, the less-worn storage extents are less worn than the more-worn storage extents.

In some arrangements, performing the set of access operations includes performing a garbage collection operation that accesses and consolidates valid data stored in the less-worn storage extents to free the less-worn storage extents to store data over the more-worn storage extents.

In some arrangements, the method further includes, in response to garbage-collection efficiency falling below a predefined efficiency threshold, adjusting the predefined wear level threshold to increase a number of the less-worn storage extents from which the garbage collection operation accesses and consolidates the valid data.

In some arrangements, performing the set of access operations includes, in response to receiving write data flushed from a cache, performing a write operation that stores the write data in the less-worn storage extents over the more-worn storage extents.

In some arrangements, the candidate storage extent is an uber including multiple physical large blocks (PLBs). The multiple PLBs are formed from a plurality of storage locations of the multiple storage devices. Additionally, obtaining a wear level metric of the candidate storage extent includes generating the wear level metric by averaging wear levels of the plurality of storage locations for the multiple PLBs in the uber.

In some arrangements, the method further includes generating a wear imbalance level indicating a variance between a first wear level of a first set of storage devices and a second wear level of a second set of storage devices. The first set of storage devices is different from the second set of storage devices. Additionally, the method further includes, after generating the wear imbalance level, performing a comparison operation that compares the wear imbalance level to a predefined imbalance threshold. Additionally, the method further includes, in response to the comparison operation indicating that the wear imbalance level is above the predefined imbalance threshold, forming a combined set of storage devices from the first set of storage devices and the second set of storage devices. The combined set of storage devices provides multiple ubers having respective uber wear levels.

In some arrangements, forming the combined set of storage devices includes performing a striping operation that forms the multiple ubers as multiple sets of redundant array of independent disk (RAID) stripes from storage devices of both the first set of storage devices and the second set of storage devices. First RAID stripes of a first uber have higher wear than second RAID stripes of a second uber.

In some arrangements, performing the striping operation includes provisioning the sets of RAID stripes to have respective RAID widths larger than both a first number of storage devices in the first set of storage devices and a second number of storage devices in the second set of storage devices.

In some arrangements, generating the wear imbalance level includes:
(A) providing the first wear level of the first set of storage devices by averaging first proportions of respective numbers of consumed program/erase (P/E) cycles of the first set of storage devices to respective total estimated numbers of P/E cycles of the first set of storage devices;
(B) providing the second wear level of the second set of storage devices by averaging second proportions of respective numbers of consumed P/E cycles of the second set of storage devices to respective total estimated numbers of P/E cycles of the second set of storage devices; and
(C) providing, as the wear imbalance level, a difference between the first wear level and the second wear level.

In some arrangements, the method further includes, while operating the first set of storage devices, receiving an expansion instruction to utilize the second set of storage devices. The method further includes performing a second assessment operation that indicates that the second set of storage devices includes a number of storage devices less than a predefined minimum-RAID threshold. Additionally, forming the combined set of storage devices is further in response to the second assessment operation indicating that the number of storage devices in the second set of storage devices is less than the predefined minimum-RAID threshold.

This Summary is provided merely for purposes of summarizing some example embodiments so as to provide a basic understanding of some aspects of the disclosure. Accordingly, it will be appreciated that the above-described example embodiments are merely examples and should not be construed to narrow the scope or spirit of the disclosure in any way. Other embodiments, aspects, and advantages will become apparent from the following detailed description taken in conjunction with the accompanying drawings which illustrate, by way of example, the principles of the described embodiments.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views. The drawings are not necessarily to scale, emphasis instead being placed upon illustrating the principles of various embodiments.

DETAILED DESCRIPTION

An improved technique is directed to managing storage extents using wear level metrics. The storage extents are formed from multiple storage devices and have respective wear levels based on the respective storage devices used to form them. Less-worn storage extents are prioritized over more-worn storage extents when performing access operations (e.g., write operations, garbage collection, and so forth). In this manner, device usage is weighted towards storage devices with lower wear, providing more-even wearing between storage devices and providing longer service lifetimes of the storage devices compared to approaches that accesses storage uniformly.

The various individual features of the particular arrangements, configurations, and embodiments disclosed herein can be combined in any desired manner that makes technological sense. Additionally, such features are hereby combined in this manner to form all possible combinations, variants and permutations except to the extent that such combinations, variants and/or permutations have been expressly excluded or are impractical. Support for such combinations, variants and permutations is considered to exist in this document.

Figure 1:
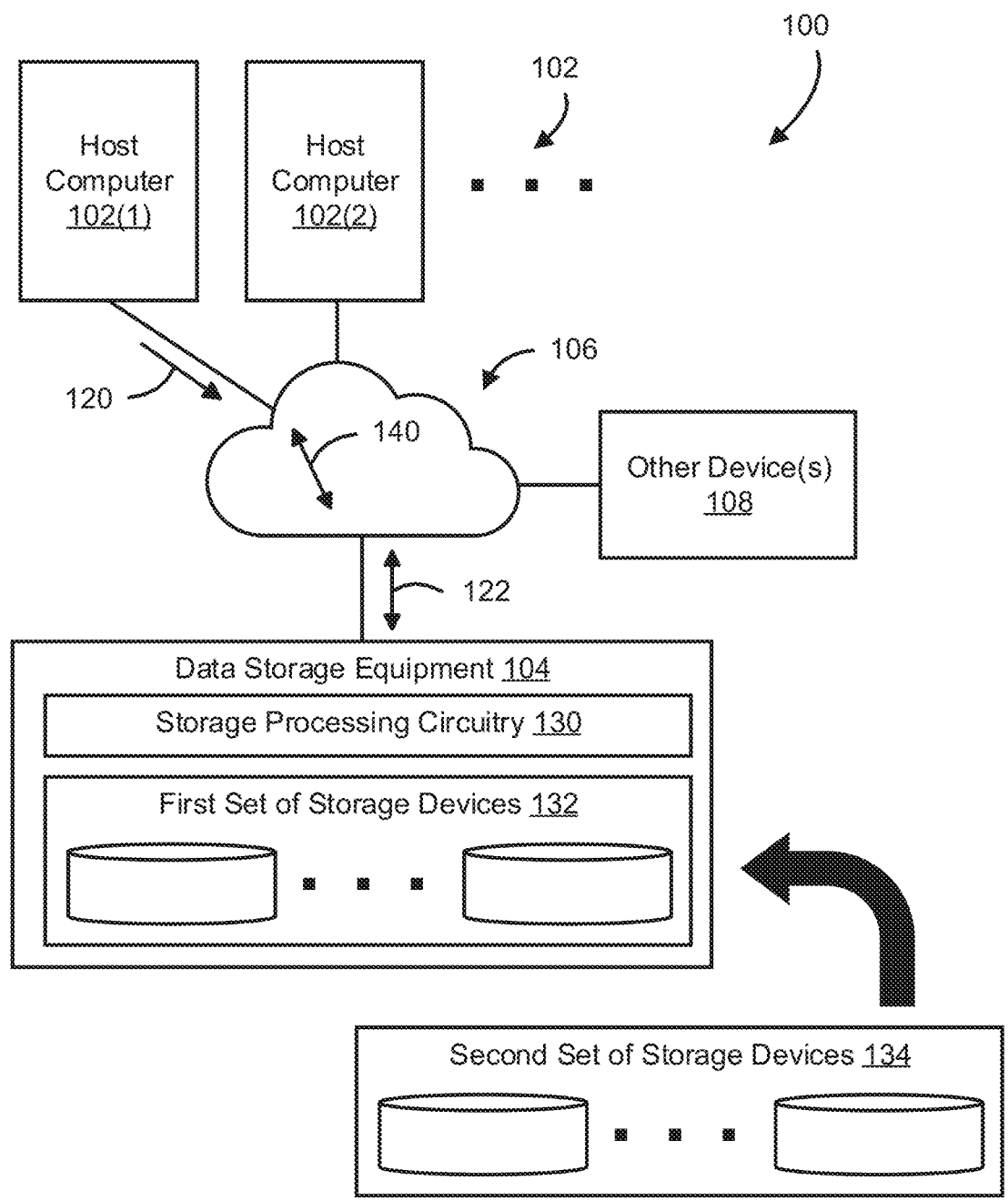
FIG. 1 is a block diagram of an example environment in accordance with certain embodiments.

FIG. 1 shows an example electronic environment 100 that provides storage device management in accordance with certain embodiments. The electronic environment 100 includes host computers 102(1), 102(2), . . . (collectively, host computers 102), data storage equipment 104, a communications medium 106, and optionally other devices 108.

Each of the host computers 102 is constructed and arranged to perform useful work. In some embodiments, one or more of the host computers 102 operate as a file server, a web server, an email server, an enterprise server, a database server, a transaction server, combinations thereof, etc. which provide host input/output (I/O) requests 120 to the data storage equipment 104. In some embodiments, the host computers 102 provide a variety of different host I/O requests 120 (e.g., block and/or file-based write commands, block and/or file-based read commands, combinations thereof, etc.) that direct the data storage equipment 104 to richly and reliably store host data 122 within and retrieve the host data 122 from storage (e.g., primary storage or main memory, secondary storage, tiered storage, combinations thereof, etc.).

The data storage equipment 104 (e.g., a storage array, a storage system, etc.) initially includes storage processing circuitry 130 and a first set of storage devices 132. In some embodiments, the data storage equipment 104 later utilizes additional storage devices to increase storage capacity. For example, as shown in FIG. 1, the storage processing circuitry 130 performs an expansion operation that incorporates a second set of storage devices 134 into the data storage equipment 104.

The storage processing circuitry 130 is constructed and arranged to respond to the host I/O requests 120 from the host computers 102 by writing data into and reading the data from the first set of storage devices 132 and the second set of storage devices 134. In some embodiments, the storage processing circuitry 130 includes one or more physical storage processors (SPs) or engines, data movers, director boards, blades, I/O modules, storage device controllers, switches, other hardware, combinations thereof, and so on.

Further, the storage processing circuitry 130 is constructed and arranged to organize storage of the first set of storage devices 132 and the second set of storage devices 134 into storage extents called "ubers." In some embodiments, each uber includes a plurality of storage sections from multiple storage devices (e.g., a plurality of 4 GB storage slices) according to a particular RAID scheme (e.g., RAID 5, RAID 6, combinations thereof, etc.). In some embodiments, the plurality of storage sections of each uber provides a fixed-size storage capacity in which to store host data (e.g., 64 GB, 128 GB, etc.) and an additional fixed-sized storage capacity in which to store parity data (e.g., 32 GB, 64 GB, etc.).

In some embodiments, the storage processing circuitry 130 writes data to individual physical large blocks (PLBs) within an uber. In some embodiments, each PLB spans (or is distributed across) multiple storage devices supporting an uber. In some embodiments, each PLB is constructed and arranged to contain a fixed amount of compressed host data (e.g., 2 MB, 4 MB, etc.) and a fixed amount of parity data (1 MB, 2 MB, etc.).

The first set of storage devices 132 and the second set of storage devices 134 are constructed and arranged to provide persistent/non-volatile storage in accordance with one or more RAID data protection schemes. In some embodiments, the first set of storage devices 132 and the second set of storage devices 134 include one or more types of storage drives, e.g., non-volatile random access memory (NVRAM) devices, solid state drives (SSDs), hard disk drives (HDDs), combinations thereof, and so on. In some embodiments, at least some of the first set of storage devices 132 and/or the second set of storage devices 134 provide non-volatile storage using a mapped-RAID architecture. Moreover, in accordance with certain embodiments, various physical componentry may be virtualized for additional flexibility, fault tolerance, load balancing, and so on (e.g., virtual data movers, virtual storage devices, etc.).

In some embodiments, the first set of storage devices 132 and the second set of storage devices 134 include multiple storage locations called "erase blocks" that are constructed and arranged to store data. In these embodiments, each erase block has a fixed size (e.g., 4 KB, 8 KB, 16 KB, etc.) and is constructed and arranged to withstand a respective number of program/erase (P/E) cycles (e.g., 2,000 cycles, 10,000 cycles, etc.). In a given P/E cycle, the storage processing circuitry 130 writes data to and erases data from the respective erase block. In some embodiments, the first set of storage devices 132 and the second set of storage devices 134 record a number of consumed P/E cycles for each erase block. Similarly, in some embodiments, the first set of storage devices 132 and the second set of storage devices 134 record an average wear level indicating an average amount of consumed P/E cycles to a total number of P/E cycles that the erase blocks are expected to withstand.

The communications medium 106 is constructed and arranged to connect the various components of the electronic environment 100 together to enable these components to exchange electronic signals 140 (e.g., see the double arrow 140). At least a portion of the communications medium 106 is illustrated as a cloud to indicate that the communications medium 106 is capable of having a variety of different topologies including backbone, hub and spoke, loop, irregular, combinations thereof, and so on. Along these lines, the communications medium 106 may include copper-based data communications devices and cabling, fiber optic devices and cabling, wireless devices, combinations thereof, etc. Furthermore, the communications medium 106 is capable of supporting LAN-based communications, SAN-based communications, cellular communications, WAN-based communications, distributed infrastructure communications, other topologies, combinations thereof, etc.

The other devices 108 represent other possible componentry of the electronic environment 100. Along these lines, the other devices 108 may include remote data storage equipment that provides data to and/or receives data from the data storage equipment 104 (e.g., replication arrays, backup and/or archiving equipment, service processors and/or management/control devices, combinations thereof, etc.).

During operation and as will be explained in further detail shortly, the storage processing circuitry 130 provides multiple ubers from storage of the first set of storage devices 132 and the second set of storage devices 134. The ubers have different levels of wear based on the storage devices used to form the ubers. For example, ubers formed using drives with little remaining wear capacity will have more wear than ubers formed using drives with higher remaining wear capacity. Less-worn ubers are prioritized over more-worn ubers when performing access operations. In this manner, the electronic environment 100 manages wear leveling by skewing usage towards storage devices with lower wear. Advantageously, skewing usage towards storage devices with lower wear increases the functional lifetime of storage devices with higher wear. Further details will now be provided with reference to FIG. 2.

Figure 2:
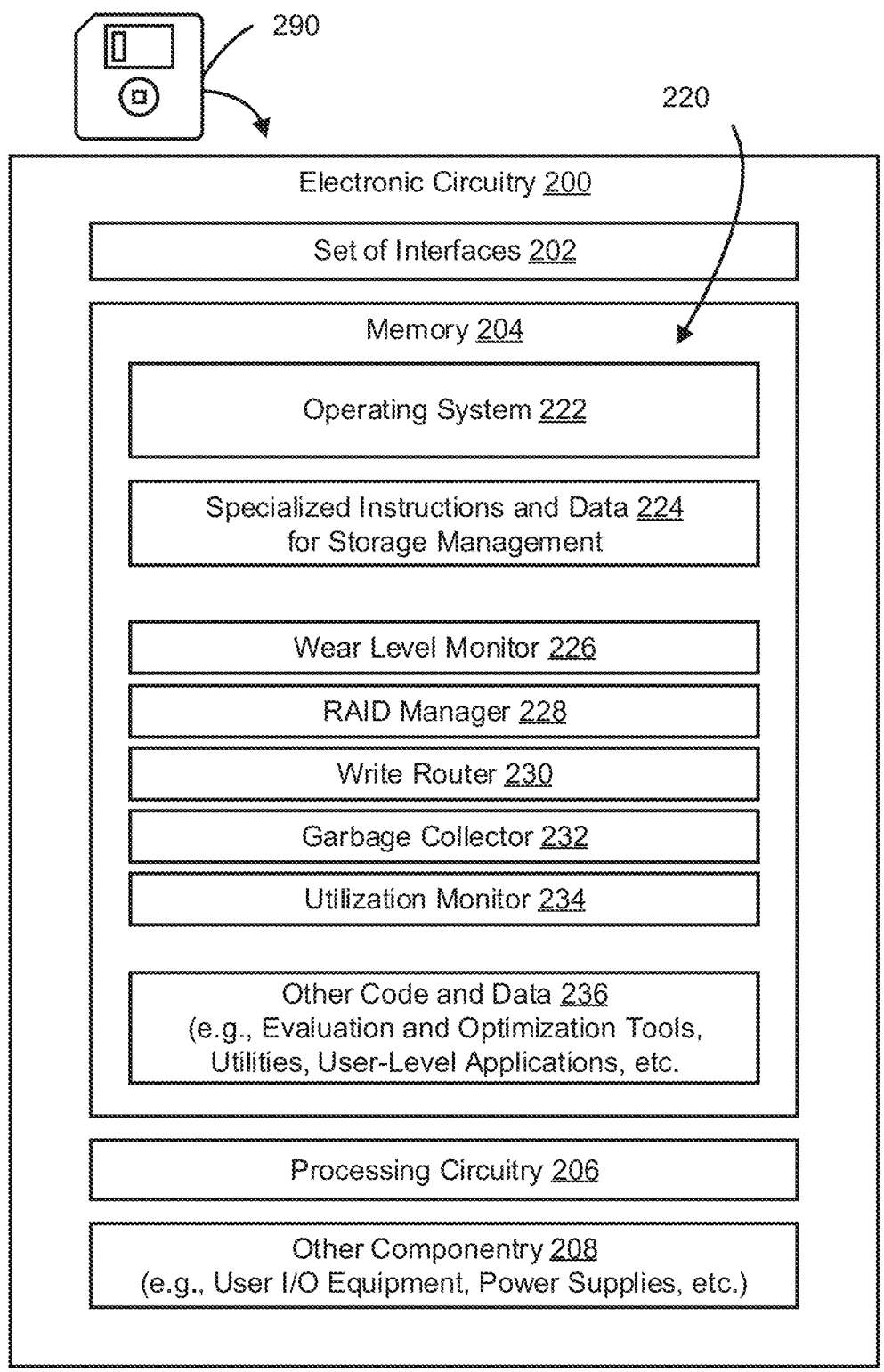
FIG. 2 is a block diagram of electronic circuitry in accordance with certain embodiments.

FIG. 2 is a block diagram of electronic circuitry 200 which is suitable for at least a portion of the data storage equipment 104 (FIG. 1) in accordance with certain embodiments. The electronic circuitry 200 includes a set of interfaces 202, memory 204, processing circuitry 206, and other componentry 208.

The set of interfaces 202 is constructed and arranged to connect the electronic circuitry 200 to the communications medium 106 to enable communications with other devices in the electronic environment 100 (e.g., the host computers 102). In some embodiments, the communications are IP-based, SAN-based, cellular-based, cable-based, fiber-optic-based, wireless, cloud-based, combinations thereof, etc. Additionally, the set of interfaces 202 is constructed and arranged to connect the electronic circuitry 200 to other local equipment such as the first set of storage devices 132 and the second set of storage devices 134. In some embodiments, the set of interfaces 202 includes one or more host interfaces (e.g., a computer network interface, a fibre-channel interface, etc.), one or more storage device interfaces (e.g., a host adapter or HBA, etc.), and other interfaces. As a result, the set of interfaces 202 enables the electronic circuitry 200 to robustly and reliably communicate with various apparatus.

The memory 204 includes both volatile storage (e.g., DRAM, SRAM, etc.) and non-volatile storage (e.g., flash memory, magnetic memory, etc.). The memory 204 stores a variety of software constructs 220 including an operating system 222, specialized instructions and data 224, a wear level monitor 226, a RAID manager 228, a write router 230, a garbage collector 232, a utilization monitor 234, and other code and data 236.

The operating system 222 refers to particular control code such as a kernel to manage computerized resources (e.g., processor cycles, memory space, etc.), the I/O stack (e.g., drivers), and so on. The specialized instructions and data 224 refer to particular instructions for storage management. In some arrangements, the specialized instructions and data 224 are tightly integrated with or part of the operating system 222 itself.

The wear level monitor 226 is constructed and arranged to query the first set of storage devices 132 and the second set of storage devices 134 to track respective wear levels of storage locations (e.g., erase blocks) in the data storage equipment 104. In some embodiments, the wear level monitor 226 track wear level metrics of individual ubers, e.g., by averaging wear levels of respective storage locations that support the ubers. In some embodiments, the wear level monitor 226 identifies less-worn ubers that are less worn than other ubers in the data storage equipment 104. For example, in some embodiments, the wear level monitor 226 identifies, as the less-worn ubers, ubers with wear levels below a predefined wear level threshold.

In some embodiments, the wear level monitor 226 is further constructed and arranged to generate a wear imbalance level between the first set of storage devices 132 and the second set of storage devices 134, e.g., by taking a difference between a first wear level of the first set of storage devices 132 and a second wear level of the second set of storage devices 134. For example, suppose that the first set of storage devices 132 is 60% worn and the second set of storage devices 134 is 2% worn. In this example, the wear imbalance level is 58% (60% minus 2%).

In some embodiments, the first wear level and the second wear level are average wear levels of the respective sets of storage devices. In some embodiments, the wear level monitor 226 calculates the average wear levels as a proportion of consumed P/E cycles to total expected P/E cycles of storage locations (e.g., erase blocks) in the storage devices.

The RAID manager 228 is constructed and arranged to manage the first set of storage devices 132 and the second set of storage devices 134 to provide redundant storage protection for stored data. In some embodiments, the RAID manager 228 provides the redundant storage protection by providing a set of RAID stripes across multiple storage devices. In some embodiments, each RAID stripe includes a set of data sections and a set of parity sections according to a predefined RAID configuration (e.g., RAID 5, RAID 6, combinations thereof, etc.). In some embodiments, the RAID manager 228 is further constructed and arranged to perform a striping operation that provides RAID stripes that use the same or different storage devices.

The write router 230 is constructed and arranged to direct write data (e.g., the host data 122, data from the garbage collector 232, combinations thereof, etc.) to the first set of storage devices 132 and the second set of storage devices 134 based on wear level metrics. In some embodiments, the write router 230 directs write data to the less-worn ubers identified by the wear level monitor 226.

In some embodiments, the write router 230 is further constructed and arranged to monitor respective write rates to the ubers. Along these lines, in response to the write router 230 detecting that the write rate to the less-worn ubers reaches a predefined write bandwidth threshold, the write router 230 is configured to maintain write performance by direct adjustments to the predefined wear level threshold to increase a number of ubers in which the write router 230 directs write data.

The garbage collector 232 is constructed and arranged to perform garbage collection on the first set of storage devices 132 and the second set of storage devices 134. Along these lines, the garbage collector 232 performs garbage collection by identifying physical large blocks (PLBs) that are partially filled with valid data, directing the valid data to be written into a new PLB, and indicating the old PLBs as invalid. In some embodiments, the garbage collector 232 is further constructed and arranged to record garbage collection efficiency, e.g., an average number of blocks made available in a set of garbage collection cycles.

The utilization monitor 234 is constructed and arranged to query the storage devices to generate respective utilization levels of the ubers. In some embodiments, the utilization monitor 234 is further constructed and arranged to direct adjustments to the predefined wear level threshold. For example, in some embodiments, in response to detecting that garbage-collection efficiency has fallen below a predefined efficiency threshold, the utilization monitor 234 instructs the wear level monitor 226 to increase the predefined wear level threshold to increase a number of ubers in which garbage collection accesses and consolidates valid data.

The other code and data 236 include applications and routines to provide additional operations and services (e.g., performance measurement tools, etc.), user-level applications, administrative tools, utilities, and so on.

During operation, the wear level monitor 226 obtains respective wear levels of ubers and performs a set of assessment operations to identify less-worn ubers to access over more-worn ubers, e.g., by comparing wear levels of the ubers to a predefined wear level threshold. In response to receiving instructions to perform a set of access operations (e.g., to store data flushed from a cache, to perform garbage collection, combinations thereof, etc.), the write router 230 directs write data to the less-worn ubers.

Moreover, during operation, the garbage collector 232 functions to consolidate valid data in the ubers. In some embodiments, the wear level monitor 226 identifies the less-worn ubers as the ubers from which the garbage collector 232 accesses valid data. In some embodiments, the utilization monitor 234 tracks garbage-collection efficiency, and in response to garbage-collection efficiency falling below a predefined efficiency threshold, the utilization monitor 234 directs the wear level monitor 226 to adjust the predefined wear level threshold to increase the number of less-worn ubers from which the garbage collector 232 accesses and consolidates the valid data. In this manner, the utilization monitor 234 creates more opportunities for the garbage collector 232 to free PLBs from the ubers, increasing garbage-collection efficiency. Further details will now be provided with reference to FIG. 3.

Figure 3:
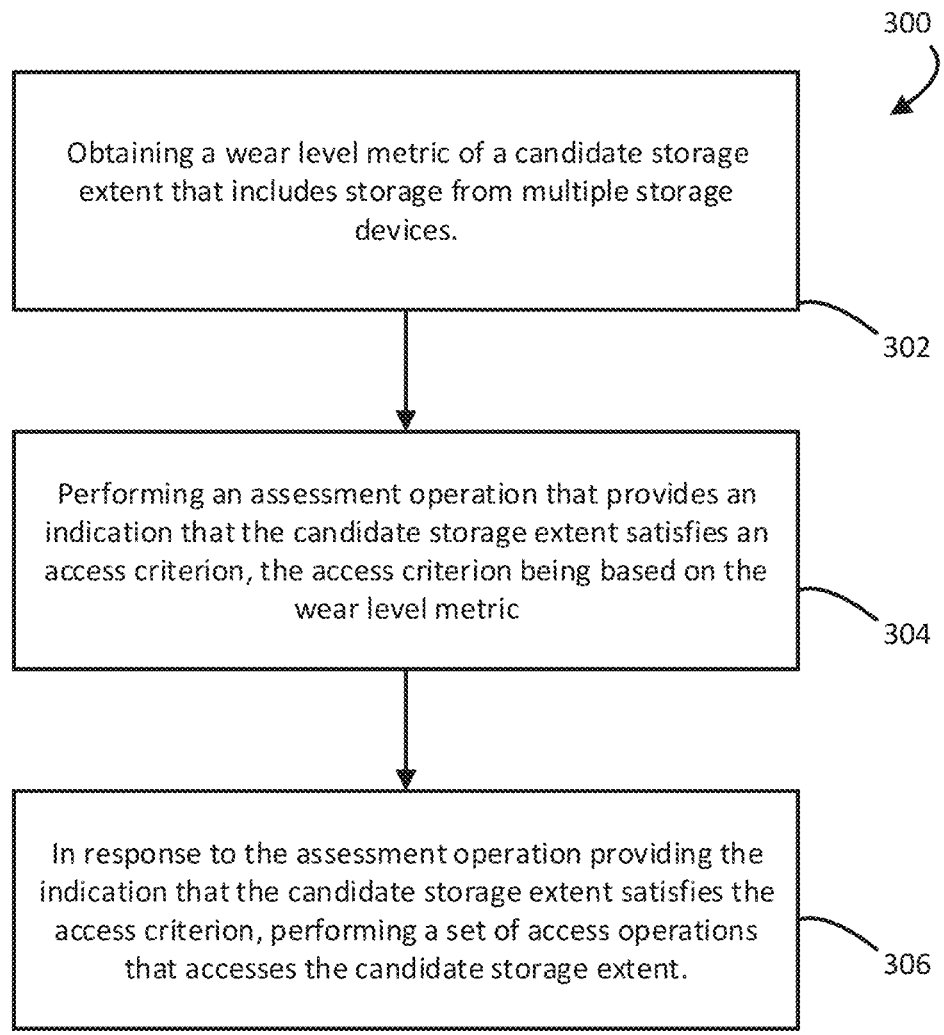
FIG. 3 is a flowchart of a procedure that is performed by specialized equipment in accordance with certain embodiments.

FIG. 3 is a flowchart of a procedure 300 which is performed by specialized equipment in accordance with certain embodiments. The procedure 300 carries out storage device management of the first set of storage devices 132 and the second set of storage devices 134.

At 302, the wear level monitor 226 obtains a wear level metric of a candidate storage extent that includes storage from multiple storage devices. In some embodiments, the wear level metric indicates an amount of wear of the candidate storage extent. In some embodiments, the wear level metric is an average wear level of the storage locations supporting the candidate storage extent. For example, in some embodiments, the candidate storage extent is an uber including multiple physical large blocks (PLBs), and the multiple PLBs are formed from a plurality of storage locations of multiple storage devices. In this case, the wear level metric is generated by averaging wear levels of the plurality of storage locations for the multiple PLBs in the uber.

At 304, the wear level monitor 226 performs an assessment operation that provides an indication that the candidate storage extent satisfies an access criterion. The access criterion is based on the wear level metric. In some embodiments, the wear level monitor 226 performs the assessment operation by performing a comparison operation that indicates that the wear level metric of the candidate storage extent is below a predefined wear level threshold. In some embodiments, the comparison operation is part of a service that identifies less-worn storage extents to access over more-worn storage extents.

At 306, in response to the assessment operation providing the indication that the candidate storage extent satisfies the access criterion, the storage processing circuitry 130 performs a set of access operations that accesses the candidate storage extent. In some embodiments, the set of access operations includes a garbage collection operation that accesses and consolidates valid data of the less-worn storage extents to free the less-worn storage extents to store data over the more-worn storage extents. In some embodiments, the set of access operations includes a write operation that stores write data in the less-worn storage extents over the more-worn storage extents. In some embodiments, the storage processing circuitry 130 performs the write operation in response to receiving the write data flushed from a cache. Advantageously, by accessing the less-worn storage extents more often than the more-worn storage extents, wearing occurs more heavily on storage devices that are less-worn, providing more-even wear leveling between the storage devices. Further details will now be provided with reference to FIG. 4.

Figure 4:
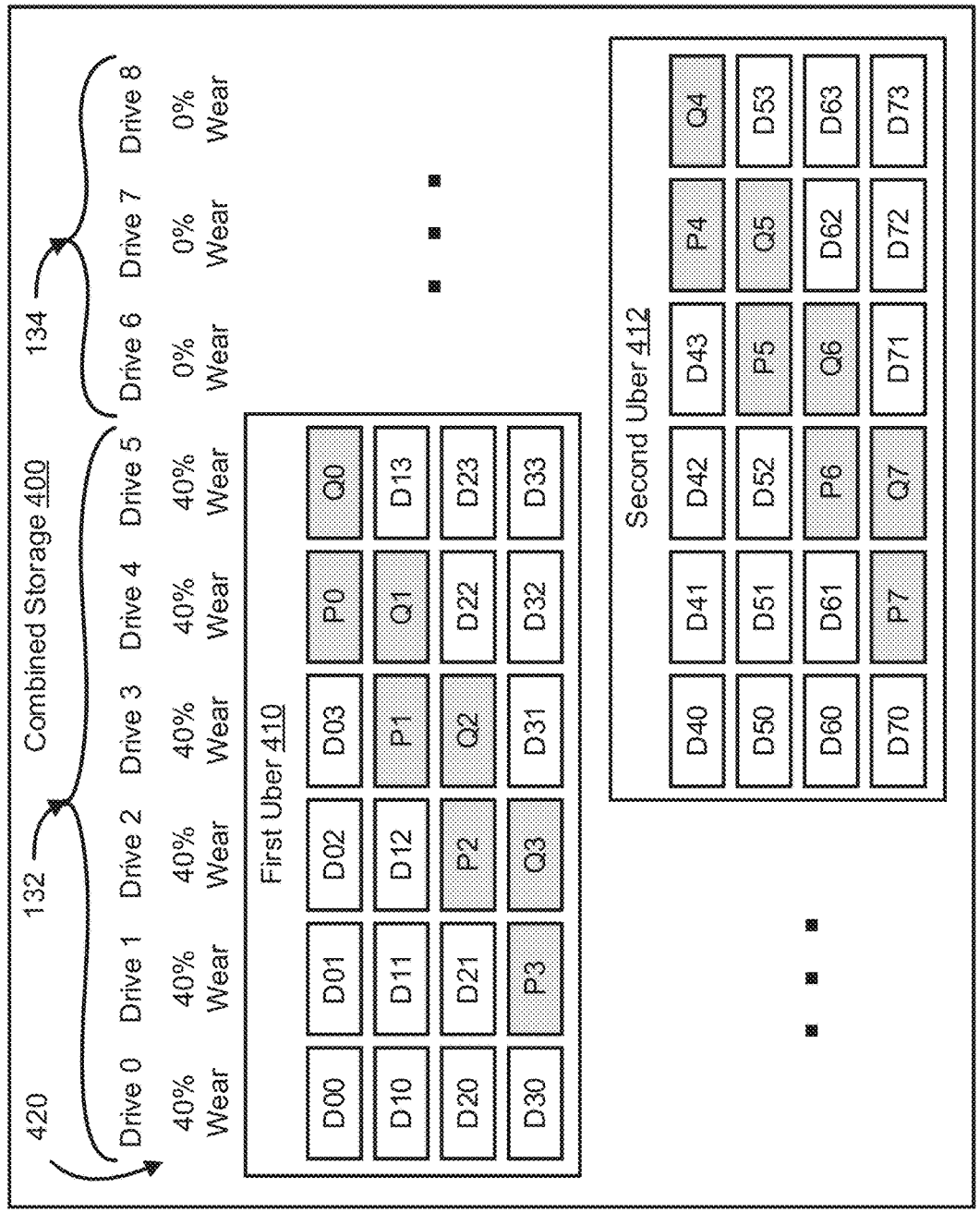
FIG. 4 is a block diagram illustrating storage management across multiple storage devices in accordance with certain embodiments.

FIG. 4 is a block diagram illustrating storage management using multiple ubers. As shown, combined storage 400 includes the first set of storage devices 132 (Drive 0 through Drive 5) and the second set of storage devices 134 (Drives 6 through Drive 8). Also shown are wear levels 420 of the first set of storage devices 132 and the second set of storage devices 134.

A first uber 410 and a second uber 412 are provided from the combined storage 400. As shown, the first uber 410 includes storage from Drive 0 through Drive 5, and the second uber 412 includes storage from Drives 3 through Drive 8. As shown, the first uber 410 and the second uber 412 constructed and arranged under a RAID-6(4+2) scheme. However, it should be understood that FIG. 4 is provided for example purposes and, in some embodiments, the first uber 410 and the second uber 412 have different RAID configurations (e.g., RAID 1, RAID 5, RAID 10, combinations thereof, etc.), more or fewer data and/or parity sections, more or fewer storage sections, more or fewer RAID stripes, combinations thereof, etc. Additionally, in some embodiments, the combined storage 400 includes fewer or more storage locations, fewer or more ubers, combinations thereof, etc.

As shown, the first uber 410 and the second uber 412 include data sections denoted using the format Dij, where i indicates stripe number and j indicates individual data sections within the stripe. Further, the first uber 410 and the second uber 412 include parity sections denoted using the format Pi and Qi, where i indicates stripe number.

In some embodiments, the wear levels 420 vary between different storage locations in the first set of storage devices 132 and the second set of storage devices 134. For example, as shown, storage locations of Drive 0 have 40% wear, while storage locations of Drive 6 have 0% wear. It should be understood that FIG. 4 is provided for example purposes, and in some embodiments, there are different amounts of overall wear levels between storage devices, different amounts of wear levels between storage locations within a single storage device, combinations thereof, etc.

During operation, the wear level monitor 226 calculates the wear level of the first uber 410 and the second uber 412 by taking an average wear level of the respective storage locations of the particular uber. For example, as shown, the first uber 410 has an average wear level of 40% (each of its storage locations having a wear level of 40%) and the second uber 412 has an average wear level of 20% (its storage locations being evenly split between 40% wear and 0% wear). In this manner, the second uber 412 has a lower wear level metric than the first uber 410 (20% wear compared to 40% wear).

In some embodiments, the wear level monitor 226 compares the wear level metrics to a predefined wear level threshold to identify less-worn ubers to access over more-worn ubers. For example, suppose that the predefined wear level threshold is set to 30%. In this case, the wear level monitor 226 would identify the second uber 412 for access operations (e.g., garbage collection, write operations, combinations thereof, etc.), as the second uber 412 has a lower wear level than the predefined wear level threshold. In contrast, in some embodiments, the wear level monitor 226 disqualifies the first uber 410 for access operations, as the first uber 410 has a higher wear level than the predefined wear level threshold.

In some embodiments, the electronic environment 100 operates the first set of storage devices 132 as a RAID set, and later receives an expansion instruction to utilize the second set of storage devices 134. In these embodiments, the wear level monitor 226 assess whether there is a wear imbalance between the first set of storage devices 132 and the second set of storage devices 134. For example, in some embodiments, the wear level monitor 226 generates a wear imbalance level indicating a variance between a first wear level of the first set of storage devices 132 and a second wear level of the second set of storage devices 134. If the wear imbalance level is greater than a predefined imbalance threshold, the RAID manager 228 assesses whether the second set of storage devices 134 includes enough storage devices to form another RAID set, e.g., the RAID manager 228 compares the second set of storage devices 134 to a predefined minimum-RAID threshold. In some embodiments, the predefined minimum-RAID threshold is a predefined number of storage devices required to form a particular RAID configuration (e.g., 10 devices to form a RAID 6(8+2), etc.). In response to the second set of storage devices 134 including fewer storage devices than the predefined minimum-RAID threshold, the RAID manager 228 performs a striping operation that creates the first uber 410 and the second uber 412 from the combined storage 400.

It should be understood that, in some embodiments, the techniques disclosed herein are compatible with (or used in conjunction with) other techniques for managing wear leveling between storage devices. For example, in some embodiments, additional or alternative techniques are used when a number of added storage devices exceed meet or exceed (rather than fall below) the predefined minimum-RAID threshold as described above (e.g., when the number of added storage devices is sufficient to form a RAID of a particular RAID width). Likewise, in some embodiments, additional or alternative techniques are used when a wear level imbalance between storage devices is below the predefined wear imbalance threshold.

In some embodiments, the RAID manager 228 forms ubers having RAID stripes with respective RAID widths larger than the number of storage devices in the first set of storage devices 132 and larger than the number of storage devices in the second set of storage devices 134. In this case, the RAID width refers to a number of storage devices used to form the RAID stripes. Advantageously, RAID stripes with larger RAID widths are configured to store higher proportions of host data compared to RAID stripes with small RAID widths of the same RAID level. For example, a RAID 6(8+2) stores proportionally more host data than a RAID 6(4+2). Further details will now be provided with reference to FIG. 5.

Figure 5:
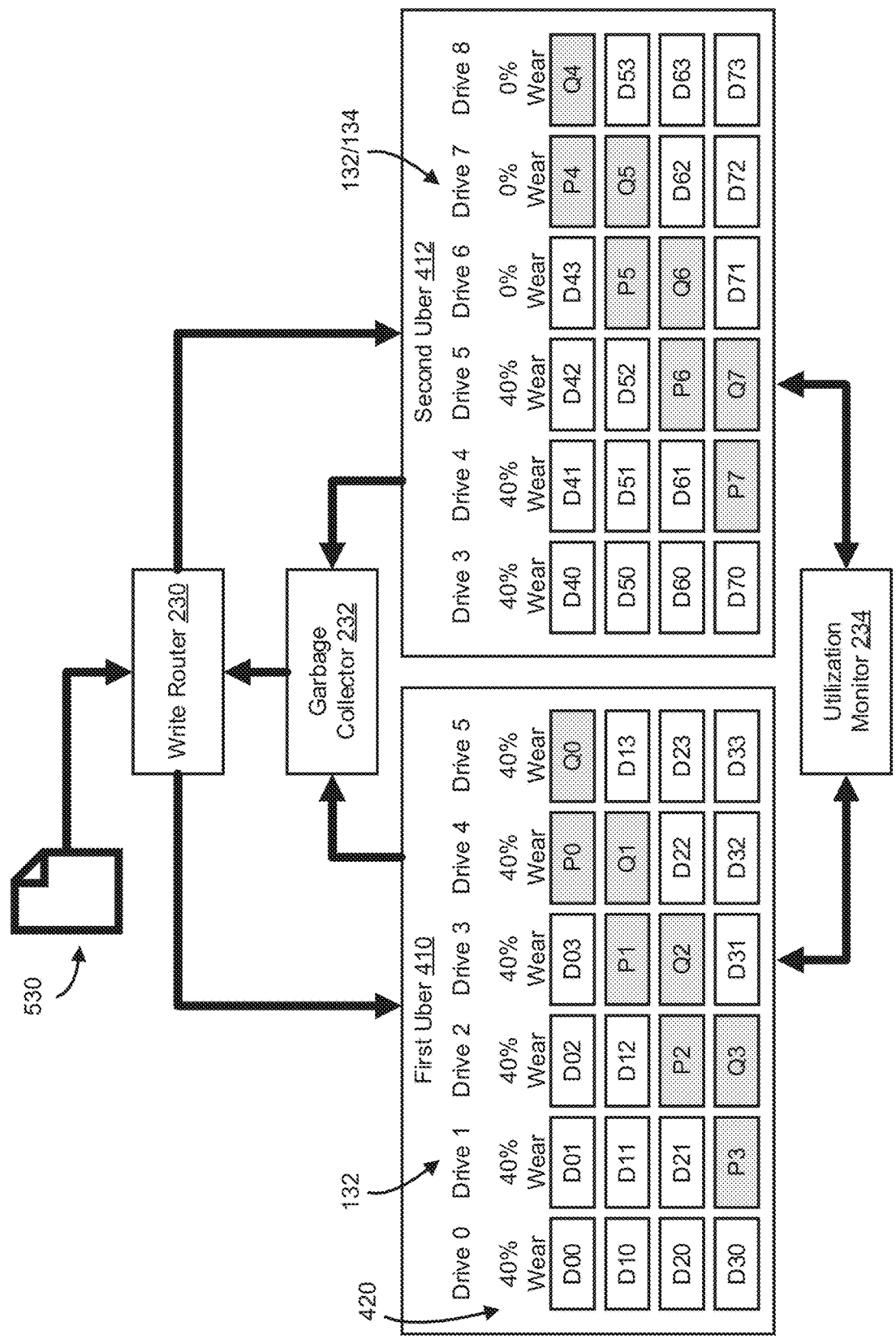
FIG. 5 is a block diagram illustrating access operations among multiple ubers in accordance with certain embodiments.

FIG. 5 is a block diagram illustrating access operations that access the first uber 410 and the second uber 412. As shown, the first uber 410 and the second uber 412 are communicatively connected with the write router 230, the garbage collector 232, and the utilization monitor 234.

During operation, the write router 230 receives an instruction to store write data 530. In some embodiments, write data 530 is flushed from a cache. In response to receiving the instruction, the write router 230 directs the write data 530 to one of the first uber 410 and the second uber 412. In some embodiments, the write router 230 directs the write data 530 to less-worn ubers (e.g., ubers with wear levels below a predefined wear level threshold as identified by the wear level monitor 226) over more-worn ubers.

Further, during operation, the garbage collector 232 consolidates valid data stored in the first uber 410 and the second uber 412 through garbage collection. In some embodiments, the write router 230 directs the consolidated data similarly to the write data 530 as described above.

In some embodiments, the utilization monitor 234 queries the first set of storage devices 132 and the second set of storage devices 134 to generate a utilization level of the ubers. Along these lines, when garbage-collection efficiency falls below a predefined efficiency threshold (e.g., when a garbage collection cycle frees number of PLBs below a preset number), the utilization monitor 234 directs the wear level monitor 226 to adjust the predefined wear level threshold to increase the number of less-worn ubers from which the garbage collector 232 performs garbage collection. In this manner, the utilization monitor 234 improves garbage-collection efficiency by creating more opportunities for the garbage collector 232 to free PLBs in each garbage-collection cycle.

As described above, improved techniques are directed to managing storage extents using wear level metrics. The storage extents are formed from multiple storage devices and have respective wear levels based on the respective storage devices used to form them. Less-worn storage extents are prioritized over more-worn storage extents when performing access operations (e.g., write operations, garbage collection, and so forth). In this manner, device usage is weighted towards storage devices with lower wear, providing more-even wearing between storage devices and increasing the longevity of the storage devices with higher wear.

One should appreciate that the above-described techniques do not merely collect and store data. Rather, the disclosed techniques include storing write data in particular ubers to provides more-even wear leveling between storage devices. Accordingly, such techniques enable wear level management between storage devices.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the electronic environment 100 such as the data storage equipment 106, etc. are capable of being implemented in or "moved to" the cloud, i.e., to remote computer resources distributed over a network. Here, the various computer resources may be distributed tightly (e.g., a data storage system in a single facility) or over relatively large distances (e.g., over a campus, in different cities, coast to coast, etc.). In these situations, the network connecting the resources is capable of having a variety of different topologies including backbone, hub and spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN based communications, combinations thereof, and so on.

In another example, although various wear levels have been described in terms of percentage (e.g., 40% wear), some embodiments use different units to describe wear levels of storage devices (e.g., remaining P/E cycles, etc.). For example, suppose that the electronic environment includes old storage devices with storage locations that have 40% wear and that are expected to withstand an additional 10,000 P/E cycles. Further suppose that the electronic environment is later expanded to include new storage devices with storage locations that have 0% wear but are expected to withstand only 5,000 P/E cycles. Although the new storage devices have lower percentages of wear (0% versus 40% wear), ubers constructed using the new storage devices will be able to withstand fewer P/E cycles compared to ubers constructed using a higher number of the old storage devices. In this case, ubers constructed using the old storage devices may be still be considered "less worn" than ubers constructed using the new storage devices.

Some embodiments are composed of storage nodes which consists of CPU, memory and a disk array enclosure (DAE) with SSD drives as the backend. Some embodiments use a RAID 5 or RAID 6 parity protection scheme to store the user data. In these embodiments, the RAID is organized in grids of fixed size blocks, with R rows and K+1 (RAID 5) or K+2 (RAID 6) columns called UBERs. Each column is a separate physical drive, and one (RAID 5) or two (RAID 6) columns are designated as parity. For RAID 6, for example, each UBER is constructed with a subset of K+2 drives (out of total N drives in the DAE); different UBERs may have different K+2 drives. As shown in FIG. 4, each of the first set of storage devices 132 and the second set of storage devices 134 is organized as an UBER with 4+2 (K=4) drives.

In some embodiments, each line in an UBER is a physical large block (PLB) that contains 2 MB of compressed data. The 2 MB of compressed data is split between four drives (e.g., Drives 0-3), each storing 512 KB of the compressed data, and each parity drive stores 512 KB of parity, which means each line stores a total of 3 MB.

In some embodiments, each UBER contains fixed capacity (e.g., 64 GB) of user data (excluding parity), and is constructed with fixed size slices from different storage devices (e.g., 4 GB). Referring to the above example, an UBER with 4+2 (K=4) drives will have 4 slices on each drive (4 slices of 4 GB×4 data drives=4×4×4=64 GB of user data), while the total UBER capacity is 96 GB (including 2 parity drives).

Some embodiments use log-structured writes for the user data and stores write data in full PLB increments. When a data block within an existing PLB is overwritten, the new (compressed) data will be written (together with more new data) to a new (empty) PLB. In some embodiments, the existing PLB which held the old data is not modified at this time—the updated block is only marked as invalidated.

Some embodiments use a Garbage Collection (GC) process which merges partially utilized PLBs and writes them to a new PLB, freeing the old PLBs. As a result, the free PLBs are randomly spread in the drives, and therefore the storage system randomly writes to the SSDs.

In some embodiments, data is written to the SSDs in "erase block" units, which are completely erased before they are rewritten. The SSD supports a limited number of Program/Erase (P/E) cycles for each erase block. Therefore, the SSD has a limited lifetime, and its wear level increases with writes. The SSD wear is especially significant with quad-level cell (QLC) drives, in which the number of P/E cycles are much more limited than triple-level cell (TLC) drives.

Some embodiments support a scale-up by adding new SSD drives to the DAE. Following a scale-up, these embodiments "restripe" the UBERs to also include the new drives, as if the UBER was initially started with both the old drives and the new drives. Subsequently, there is a wear-level imbalance between the old drives and the new drives.

It should be understood that operating the old drives and the new drives without managing the wear level between the drives leads to a shorter actual lifetime of the old drives, compared to a system that initially started with both the old and new drives. Further, the wear-level imbalance may cause additional problems if drives that are nearly worn out have more errors or performance impact. As mentioned above, the imbalance is more significant with QLC drives which wear out faster.

For example, consider a conventional data storage system that runs for 2 years with 10 SSDs that become 40% worn, and the system is scaled-up with 10 new drives. Assuming that system usage stays the same, the storage drives would now wear down at a rate a 10% per year, as the usage is spread between more storage drives. Thus, the old drives will wear out after an additional 6 years (8 years in total). However, if the data storage system was initially started with 20 drives, the lifetime would have had a longer expected lifetime of 10 years.

In some embodiments, each UBER is assigned with an "UberAvgWear" value, which is calculated by the average wear-level of all the respective UBER drives.

In some embodiments, the Garbage Collector (GC) component is modified to use the UberAvgWear value for choosing the PLBs to clean. The GC will choose PLBs from the least worn UBERs, by cleaning PLB from UBERs with UberAvgWear value below a "WearThreshold" value. In some embodiments, the WearThreshold value depends on the actual system state at the time of the scale-up.

Similarly, in some embodiments, the flush processes choose PLBs for write from UBERs with UberAvgWear values below the WearThreshold value.

For example, consider a system that is using an 8+2 RAID scheme, running for 2 years with 10 SSDs that are 40% worn, and the system is scaled-up with 5 new drives. In this example, the WearThreshold values will have a range between 0% and 40%: UBERs that contain only the new drives will have 0% wear, while UBERs that contain only old drives will have 40% wear. UBERs that contain 5 old drives and 5 new drives will have 20% wear (0.5*0%+0.5*40%).

In some embodiments, the lower the WearThreshold value, the GC will take PLBs from UBERs that contain more new drives. This may impact the GC efficiency, because the GC may be limited to choose PLBs only from UBERs with UberAvgWear value less than WearThreshold and therefore may choose PLBs that are less efficient for GC. Thus, some embodiments monitor the GC efficiency and adjust the WearThreshold dynamically, such that the GC efficiency impact will be less than a predefined efficiency threshold.

After a scale-up, some embodiments will have a wear-level disbalance, and these techniques will "route" most of the writes to UBERs that are constructed with more new drives. For example, UBER A with 10 new drives and 8 old drives, for 16+2 RAID scheme, will have a lower UberAvgWear value than UBER B with 4 new drives and 14 old drives. Therefore, the described method will choose PLBs from UBER A for write, rather than from UBER B, which will write to 10 new drives vs 8 old drives.

The proposed techniques balance the wear level of the DAE drives, which will extend the actual lifetime of the old drives and the overall system, while avoiding performance impact.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document. Such modifications and enhancements are intended to belong to various embodiments of the disclosure.

What is claimed is:

1. A method of managing storage devices, the method comprising:
   obtaining a wear level metric of a candidate storage extent that includes storage locations from multiple storage devices, the wear level metric indicating an amount of wear of the candidate storage extent;
   performing an assessment operation that provides an indication that the candidate storage extent satisfies an access criterion, the access criterion being based on the wear level metric; and
   in response to the assessment operation providing the indication that the candidate storage extent satisfies the access criterion, performing a set of access operations that accesses the candidate storage extent;
   wherein the candidate storage extent is included in a plurality of storage extents;
   wherein the wear level metric is an average amount of consumed program/erase (P/E) cycles for the storage locations in the candidate storage extent over total P/E cycles that the storage locations are estimated to withstand;
   wherein the access criterion is the average amount being below a predefined wear level threshold; and
   wherein the method further comprises:

prior to performing the assessment operation, detecting that available write bandwidth has fallen below a predefined available write bandwidth threshold; and in response to detecting that the available write bandwidth has fallen below the predefined available write bandwidth threshold, increasing the predefined wear level threshold to increase a number of storage extents of the plurality of storage extents that have respective wear level metrics below the predefined wear level threshold.

2. The method of claim 1 wherein performing the assessment operation includes:

performing a comparison operation that indicates that the wear level metric of the candidate storage extent is below the predefined wear level threshold, the comparison operation being a part of a service that identifies less-worn storage extents to access over more-worn storage extents, the less-worn storage extents being less worn than the more-worn storage extents.

3. The method of claim 2 wherein performing the set of access operations includes:

performing a garbage collection operation that accesses and consolidates valid data stored in the less-worn storage extents to free the less-worn storage extents to store data over the more-worn storage extents.

4. The method of claim 3, further comprising:

in response to garbage-collection efficiency falling below a predefined efficiency threshold, adjusting the predefined wear level threshold to increase a number of the less-worn storage extents from which the garbage collection operation accesses and consolidates the valid data.

5. The method of claim 2 wherein performing the set of access operations includes:

in response to receiving write data flushed from a cache, performing a write operation that stores the write data in the less-worn storage extents over the more-worn storage extents.

6. The method of claim 1 wherein the candidate storage extent is an uber including multiple physical large blocks (PLBs), the multiple PLBs being formed from a plurality of storage locations of the multiple storage devices; and wherein obtaining the wear level metric of the candidate storage extent includes:

generating the wear level metric by averaging wear levels of the plurality of storage locations for the multiple PLBs in the uber.

7. The method of claim 1, further comprising:

generating a wear imbalance level indicating a variance between a first wear level of a first set of storage devices and a second wear level of a second set of storage devices, the first set of storage devices being different from the second set of storage devices;

after generating the wear imbalance level, performing a comparison operation that compares the wear imbalance level to a predefined imbalance threshold; and in response to the comparison operation indicating that the wear imbalance level is above the predefined imbalance threshold, forming a combined set of storage devices from the first set of storage devices and the second set of storage devices, the combined set of storage devices providing multiple ubers having respective uber wear levels.

8. The method of claim 7 wherein forming the combined set of storage devices includes:

performing a striping operation that forms the multiple ubers as multiple sets of redundant array of independent disk (RAID) stripes from storage devices of both the first set of storage devices and the second set of storage devices, first RAID stripes of a first uber having higher wear than second RAID stripes of a second uber.

9. The method of claim 8 wherein performing the striping operation includes:

provisioning the sets of RAID stripes to have respective RAID widths larger than both a first number of storage devices in the first set of storage devices and a second number of storage devices in the second set of storage devices.

10. The method of claim 7 wherein generating the wear imbalance level includes:

providing the first wear level of the first set of storage devices by averaging first proportions of respective numbers of consumed program/erase (P/E) cycles of the first set of storage devices to respective total estimated numbers of P/E cycles of the first set of storage devices;

providing the second wear level of the second set of storage devices by averaging second proportions of respective numbers of consumed P/E cycles of the second set of storage devices to respective total estimated numbers of P/E cycles of the second set of storage devices; and providing, as the wear imbalance level, a difference between the first wear level and the second wear level.

11. The method of claim 7, further comprising:

while operating the first set of storage devices, receiving an expansion instruction to utilize the second set of storage devices; and performing a second assessment operation that indicates that the second set of storage devices includes a number of storage devices less than a predefined minimum-RAID threshold; and wherein forming the combined set of storage devices is further in response to the second assessment operation indicating that the number of storage devices in the second set of storage devices is less than the predefined minimum-RAID threshold.

12. The method of claim 1, wherein the candidate storage extent includes a first data structure formed from the storage locations of the multiple storage devices;

wherein plurality of storage extents has another storage extent that includes a second data structure formed from other storage locations of at least a portion of the multiple storage devices and one or more other storage devices;

wherein the other storage extent has a second wear level metric that is a second average amount of consumed P/E cycles for the other storage locations over total P/E cycles that the other storage locations are estimated to withstand, the second average amount being higher than the average amount;

wherein increasing the predefined wear level threshold includes raising the predefined wear level threshold above at least one of the average amount or the second average amount.

13. An electronic environment, comprising:

multiple storage devices;

memory; and control circuitry coupled with the memory, the memory storing instructions that, when carried out by the control circuitry, cause the control circuitry to perform a method of managing storage devices, the method including:

obtaining a wear level metric of a candidate storage extent that includes storage locations from the multiple storage devices, the wear level metric indicating an amount of wear of the candidate storage extent;

performing an assessment operation that provides an indication that the candidate storage extent satisfies an access criterion, the access criterion being based on the wear level metric; and in response to the assessment operation providing the indication that the candidate storage extent satisfies the access criterion, performing a set of access operations that accesses the candidate storage extent;

wherein the candidate storage extent is included in a plurality of storage extents;

wherein the wear level metric is an average amount of consumed program/erase (P/E) cycles for the storage locations in the candidate storage extent over total P/E cycles that the storage locations are estimated to withstand;

wherein the access criterion is the average amount being below a predefined wear level threshold; and wherein the method further comprises:
prior to performing the assessment operation, detecting that available write bandwidth has fallen below a predefined available write bandwidth threshold; and
in response to detecting that the available write bandwidth has fallen below the predefined available write bandwidth threshold, increasing the predefined wear level threshold to increase a number of storage extents of the plurality of storage extents that have respective wear level metrics below the predefined wear level threshold.

14. The electronic environment of claim 13 wherein performing the assessment operation includes:
performing a comparison operation that indicates that the wear level metric of the candidate storage extent is below the predefined wear level threshold, the comparison operation being a part of a service that identifies less-worn storage extents to access over more-worn storage extents, the less-worn storage extents being less worn than the more-worn storage extents.

15. The electronic environment of claim 14 wherein performing the set of access operations includes:
performing a garbage collection operation that accesses and consolidates valid data stored in the less-worn storage extents to free the less-worn storage extents to store data over the more-worn storage extents.

16. The electronic environment of claim 15, further comprising:
in response to garbage-collection efficiency falling below a predefined efficiency threshold, adjusting the predefined wear level threshold to increase a number of the less-worn storage extents from which the garbage collection operation accesses and consolidates the valid data.

17. The electronic environment of claim 14 wherein performing the set of access operations includes:
in response to receiving write data flushed from a cache, performing a write operation that stores the write data in the less-worn storage extents over the more-worn storage extents.

18. The electronic environment of claim 13 wherein the candidate storage extent is an uber including multiple physical large blocks (PLBs), the multiple PLBs being formed from a plurality of storage locations of the multiple storage devices; and
wherein obtaining the wear level metric of the candidate storage extent includes:
generating the wear level metric by averaging wear levels of the plurality of storage locations for the multiple PLBs in the uber.

19. The electronic environment of claim 13 wherein the method further includes:
generating a wear imbalance level indicating a variance between a first wear level of a first set of storage devices and a second wear level of a second set of storage devices, the first set of storage devices being different from the second set of storage devices;
after generating the wear imbalance level, performing a comparison operation that compares the wear imbalance level to a predefined imbalance threshold; and
in response to the comparison operation indicating that the wear imbalance level is above the predefined imbalance threshold, forming a combined set of storage devices from the first set of storage devices and the second set of storage devices, the combined set of storage devices providing multiple ubers having respective uber wear levels.

20. A computer program product having a non-transitory computer readable medium that stores a set of instructions to manage storage devices, the set of instructions, when carried out by computerized circuitry, causes the computerized circuitry to perform a method of:
obtaining a wear level metric of a candidate storage extent that includes storage locations from multiple storage devices, the wear level metric indicating an amount of wear of the candidate storage extent;
performing an assessment operation that provides an indication that the candidate storage extent satisfies an access criterion, the access criterion being based on the wear level metric; and
in response to the assessment operation providing the indication that the candidate storage extent satisfies the access criterion, performing a set of access operations that accesses the candidate storage extent;
wherein the candidate storage extent is included in a plurality of storage extents;
wherein the wear level metric is an average amount of consumed program/erase (P/E) cycles for the storage locations in the candidate storage extent over total P/E cycles that the storage locations are estimated to withstand;
wherein the access criterion is the average amount being below a predefined wear level threshold; and
wherein the method further comprises:
prior to performing the assessment operation, detecting that a garbage-collection efficiency has fallen below a predefined garbage-collection efficiency threshold; and
in response to detecting that the garbage-collection efficiency has fallen below the predefined garbage-collection efficiency threshold, increasing the predefined wear level threshold to increase a number of storage extents of the plurality of storage extents that have respective wear level metrics below the predefined wear level threshold.

* * * * *